No. 835,640. PATENTED NOV. 13, 1906.
C. W. ROBINSON.
CORN PLANTER.
APPLICATION FILED MAY 1, 1906.
2 SHEETS—SHEET 1.
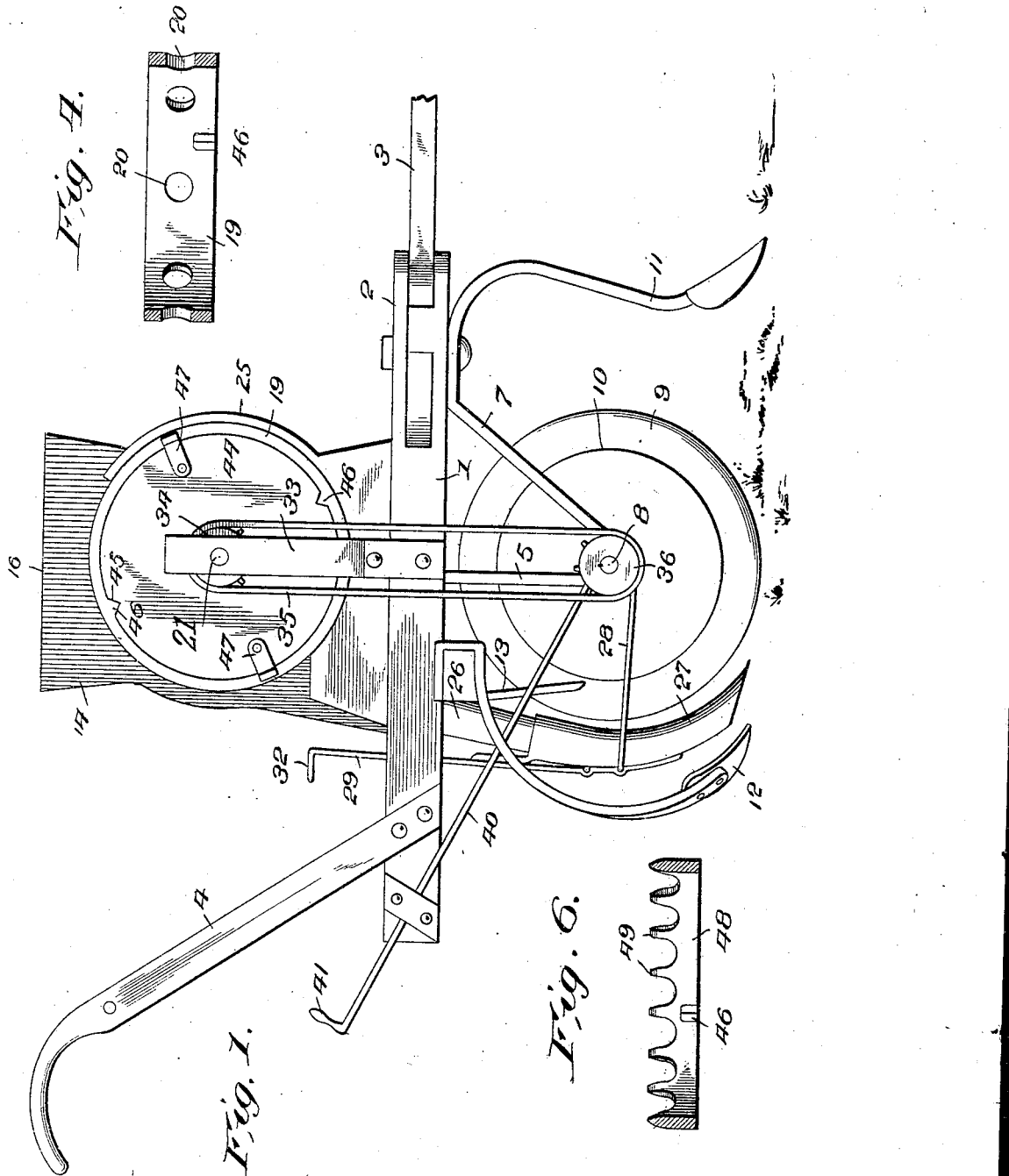
WITNESSES:
Charles W. Robinson
INVENTOR
By C. A. Snow & Co
ATTORNEYS No. 835,640.
PATENTED NOV. 13, 1906.
C. W. ROBINSON.
CORN PLANTER.
APPLICATION FILED MAY 1, 1906.
2 SHEETS—SHEET 2.
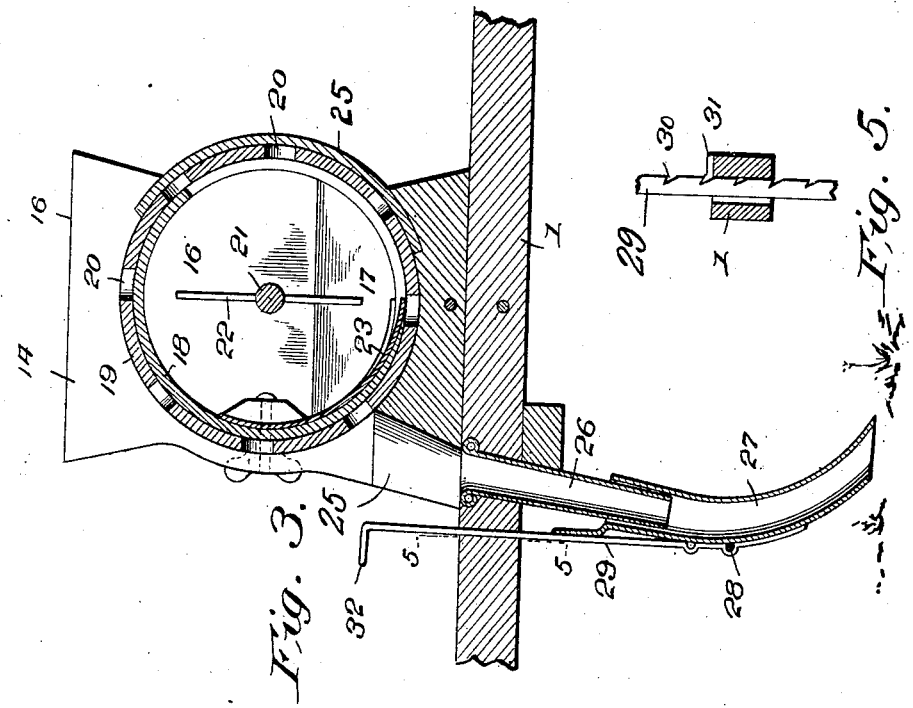
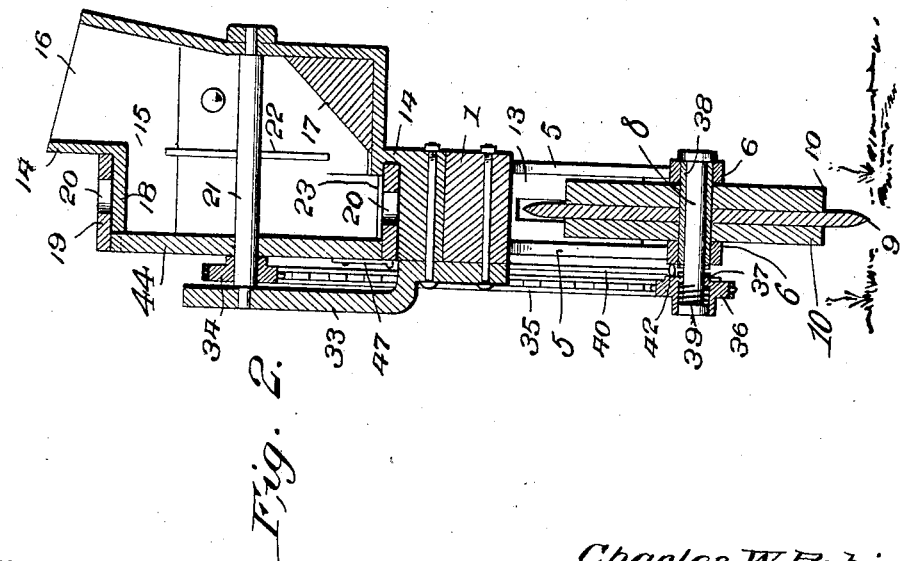
WITNESSES:
Charles W. Robinson
INVENTOR
By C. A. Snow & Co
ATTORNEYS

UNITED STATES PATENT OFFICE.

CHARLES WILLIAM ROBINSON, OF ATHENS, TEXAS.

CORN-PLANTER.

No. 835,640.          Specification of Letters Patent.          Patented Nov. 13, 1906.

Application filed May 1, 1906. Serial No. 314,689.

*To all whom it may concern:*

Be it known that I, CHARLES WILLIAM ROBINSON, a citizen of the United States, residing at Athens, in the county of Henderson and State of Texas, have invented a new and useful Corn-Planter, of which the following is a specification.

This invention relates to planters; and its object is to provide a machine of this character which is of simple and compact construction, which can be readily manipulated, and which does not require manual actuation of the drum of the dropping mechanism.

A still further object is to provide a device capable of use for planting corn and similar seeds, as well as cotton and other seeds provided with a fibrous coating.

A still further object is to provide novel means for opening a furrow and depositing seeds therein at desired depths, after which the seeds are automatically covered.

Another object is to provide a drum which can be readily changed for use in connection with seeds of different characters.

With the above and other objects in view the invention consists of a beam supported by a wheel of novel construction adapted to cut and ride within a furrow, and disposed in rear of this wheel is a seed chute or spout which is vertically adjustable and receives seeds from an outlet-tube extending from a receptacle disposed on the beam. Located above this receptacle is a rotatable drum which is driven by the wheel, and opening into the drum is a hopper for containing seeds.

The invention also consists of certain other novel features of construction and combinations of parts, which will be hereinafter more fully described, and pointed out in the claims.

In the accompanying drawings is shown the preferred form of the invention.

In said drawings, Figure 1 is a side elevation of the machine. Fig. 2 is a vertical transverse section therethrough. Fig. 3 is a vertical longitudinal section. Fig. 4 is a transverse section through the drum. Fig. 5 is a detail view showing the manner of securing the chute-adjusting rod, and Fig. 6 is a transverse section through a modified form of valve-ring.

Referring to the figures by characters of reference, 1 is a beam having an enlarged head 2 at its front end, which is slotted horizontally to form a guide for a tongue 3, which is pivoted within the slot and is supported by the walls thereof. By mounting the tongue in this manner the draft-animal can swerve to either side without affecting the forward movement of the planter if the same is properly guided by the operator. Handles 4 are secured to the rear portion of the beam, and hangers 5 extend downward from the central portion of said beam and are provided at their lower ends with bearing-blocks 6, connected to the forward portion of the beam by braces 7. In these bearing-blocks is mounted a rotatable shaft 8, to which is secured a disk-like wheel consisting of a circular blade 9, held between disks 10, as clearly shown in Fig. 2, the diameter of said blade being greater than that of the disks, so that the periphery of the blade can be used for cutting purposes.

A furrow-opener in the form of a resilient arm 11 extends downward from the beam in front of the wheel 9 10, and spring-standards carrying shovels 12 are preferably disposed in rear of the wheel for the purpose of closing the furrow after the seeds have been deposited in it. A forked scraper 13 is fastened to and hangs downward from the beam and embraces the upper portion of the wheel, so as to prevent earth or material from adhering thereto.

A supporting-plate 14 extends from one side of the beam 1 and has an opening 15 therein, about which is formed a hopper 16, which extends from one side of the plate and has an inclined bottom 17, which serves to deflect material from the scraper and through the opening 15. Arranged on the other side of the plate 14 is a circular flange 18, which is cut away at its bottom and front portions and constitutes a bearing for a drum 19, having a plurality of openings 20 in its periphery, which are adapted to be successively exposed to the contents of the hopper as said openings move within the cut-away portion of the flange 18. This drum is closed at its outer end and is secured to and rotates with a shaft 21, extending transversely through the hopper and provided with agitating-arms 22. A guard-strip 25 overlaps a portion of the periphery of the drum and extends from its rear end, and extending downward from the bottom of the recess is a tubular outlet 26, which opens into a seed-spout 27, the lower end of which is disposed directly in rear of the wheel 9 10. This spout is pivotally connected to a bail 28, which is pivoted to the bearing-blocks 6, and a supporting spring-rod 29 extends upward from the spout and through the beam and has teeth 30 adapted to engage a keeper 31, so that the rod can be held in any position to which it may be adjusted. A handle 32 is disposed at the upper end of the rod to facilitate its actuation.

A standard 33 extends upward from the beam 1 and constitutes a bearing for the shaft 21, the other end of said shaft being journaled in one wall of the hopper 16. A sprocket-wheel 34 is secured to the shaft 21 adjacent the standard, and mounted upon it is a chain 35, which extends around a sprocket 36, which is loosely mounted on the shaft 8. A toothed sleeve 37 extends laterally from the sprocket 36, and another toothed sleeve 38 extends laterally from and rotates with the wheel 9 10. These two sleeves are held normally in engagement by a spring 39, which bears against the sprocket 36, so that when the wheel is rotating in one direction the sprocket will be caused to move therewith, but when the wheel moves in the opposite direction the sprocket will remain stationary. One end of a rod 40 projects between the sprocket 36 and the adjoining bearing-block 6 and has a handle 41 at its upper end, by means of which the rod can be readily turned. The lower portion of the rod is forked or enlarged, as at 42, so that when said rod is turned the sprocket 36 is moved laterally and the two sleeves 37 and 38 are disengaged. The resilient scraper-plate 23 is secured within the hopper and bears upon the inner surface of the apertured portion of the drum, so as to prevent said apertures from becoming clogged.

It is thought that the operation of the device will be thoroughly understood from the foregoing description. When the wheel is drawn forward the point 11 on the resilient arm or standard will form a furrow, and it will be cut in two by the flange 9 on the wheel 9 10. If the sleeves 37 and 38 are in engagement, the rotation of the wheel will cause a corresponding movement of the drum 19, and seeds within the hopper will be seated by gravity in exposed openings 20 and will be carried in said openings to a point above the recess 25, whereupon the seeds will fall by gravity into said recess and thence through the tubular outlet 26 to the spout 27. This spout can be adjusted vertically by means of rod 29, so that the seeds will be planted at desired depths, and by reason of the peculiar location of the spout these seeds will be planted directly in rear of the wheel 9 10. Shovels 12 on spring-standards following after the spout 27 will cover the seeds.

Should it be desired to stop the operation of the drum, the rod 40 is oscillated so as to throw the two sleeves 37 and 38 out of engagement. The drum 19 has a disk 44 for closing one end thereof. This disk has notches 45 in its periphery, which constitute seats for lugs 46, extending inward from the drum. Plates 47 are fastened to the disk and bear on the drum, so as to prevent said drum from moving laterally out of position upon the disk. As the disk is secured to the shaft 21, the drum must necessarily move with it because of the lugs 46.

Should it be desired to use the machine for planting cotton-seeds or other seeds having fibrous coatings, it is desirable to employ a drum, such as shown at 48 (see Fig. 6) and which consists of a solid ring having teeth 49, extending from one side, forming openings therebetween for holding the seeds. The ends of the teeth are sharpened so as to tear apart the fibers on the seeds and prevent the drum from becoming clogged. Where this form of valve is employed, the scraper 23 is dispensed with.

The machine is very simple, compact in construction, and can be readily manipulated. The seeds will be accurately deposited at desired depths, and as a result of the peculiar connection of the tongue to the beam any swerving by the draft-animal will not interfere with the proper guiding of the machine by the operator.

What is claimed is—

1. In a planter the combination with a beam; of a cutting-disk constituting a supporting-wheel for the beam, a vertically-adjustable seed-chute carried in rear of the disk, a hopper, a drum connected thereto, and means operated by the disk for actuating the drum to deposit the seeds within the chute.

2. In a planter the combination with a beam; of a hopper carried thereby, and a cylindrical extension upon the hopper having a cut-away portion; of a cutting-disk constituting a supporting-wheel for the beam, a seed-engaging cylindrical drum rotatably mounted upon the cylindrical extension, a guard-strip partly surrounding the drum, a chute for receiving seeds from the drum, and means operated by the disk for actuating the drum.

3. In a planter the combination with a beam, a hopper carried thereby, and a cylindrical extension upon the hopper having a cut-away portion; of a cutting-disk constituting a supporting-wheel for the beam, a seed-engaging cylindrical drum rotatably mounted upon the cylindrical extension, a guard-strip partly surrounding the drum, a vertically-adjustable chute supported by the beam in rear of the disk, means for transmitting motion from the disk to the drum.

4. In a planter the combination with a beam having a curved seat thereon provided with a recess, an outlet-tube extending from the recess, and a vertically-adjustable chute communicating with the tube; of a hopper carried by the beam and having an outlet at one side, a cylindrical extension surrounding the outlet and having a cut-away portion, a cylindrical drum rotatably mounted on the extension and formed to permit the passage of seeds therethrough, a guard-strip partly surrounding the drum, said drum projecting into the seat, a rotatable cutting-disk constituting a supporting-beam, and means for transmitting motion from the disk to the drum.

5. In a planter the combination with a beam, a rotatable cutting-disk constituting a support therefor, and a vertically-adjustable seed-chute carried by the beam; of a hopper upon the beam and having an outlet upon one side, a rotatable drum surrounding the outlet and formed to permit the passage of seeds therethrough, a guard for said drum, means for directing seeds successively from the drum into the tube, mechanism for transmitting rotary motion from the disk to the drum, and means for shifting said mechanism into and out of operative position.

6. A planter comprising a beam, a cutting-disk constituting a supporting-wheel therefor, a forked scraper embracing the disk, a seed-chute carried by the beam in rear of the disk, means for adjusting said chute vertically, a hopper having an outlet in one side, a cylindrical extension partly surrounding the outlet, a cylindrical drum mounted upon said extension and formed to permit the passage of seeds therethrough, a scraper within the hopper and bearing on the drum, a guard-strip partly surrounding the drum, and means operated by the disk for rotating the drum.

7. In a planter a seed-dropping device comprising a drum having laterally-extending teeth upon its periphery forming openings therebetween.

8. A planter comprising a drum having openings therein, inwardly-extending lugs, a disk having recesses in its periphery constituting seats for the lugs, means upon the disk for holding the same in proper relation to the drum, said disk constituting a closure for one end of the drum.

In testimony that I claim the foregoing as my own I have hereto affixed my signature in the presence of two witnesses.

CHARLES WILLIAM ROBINSON.

Witnesses:
W. D. DEEN,
B. M. ROBERTS.